United States Patent
Li

(10) Patent No.: US 12,107,257 B1
(45) Date of Patent: Oct. 1, 2024

(54) POSITIVE ELECTRODE PLATE, LITHIUM ION BATTERY, AND ENERGY STORAGE DEVICE

(71) Applicants: SHENZHEN HITHIUM ENERGY STORAGE TECHNOLOGY CO., LTD, Guangdong (CN); XIAMEN HITHIUM ENERGY STORAGE TECHNOLOGY CO., LTD., Fujian (CN)

(72) Inventor: Lingxia Li, Guangdong (CN)

(73) Assignees: SHENZHEN HITHIUM ENERGY STORAGE TECHNOLOGY CO., LTD, Guangdong (CN); XIAMEN HITHIUM ENERGY STORAGE TECHNOLOGY CO., LTD., Fujian (CN)

( * ) Notice: Subject to any disclaimer, the term of this patent is extended or adjusted under 35 U.S.C. 154(b) by 0 days.

(21) Appl. No.: 18/621,154

(22) Filed: Mar. 29, 2024

(30) Foreign Application Priority Data

Jun. 16, 2023 (CN) .......................... 202310718022.0

(51) Int. Cl.
*H01M 4/136* (2010.01)
*H01M 4/36* (2006.01)
(Continued)

(52) U.S. Cl.
CPC ........... *H01M 4/136* (2013.01); *H01M 4/366* (2013.01); *H01M 4/5825* (2013.01);
(Continued)

(58) Field of Classification Search
CPC .... H01M 4/366; H01M 4/136; H01M 4/5825; H01M 10/0525
See application file for complete search history.

(56) References Cited

U.S. PATENT DOCUMENTS

2021/0119211 A1* 4/2021 Jen .................... H01M 4/366
2022/0149367 A1* 5/2022 Han ................. H01M 10/0525
(Continued)

FOREIGN PATENT DOCUMENTS

| CN | 102496714 A | 6/2012 |
|---|---|---|
| CN | 109004175 A | 12/2018 |

(Continued)

OTHER PUBLICATIONS

The First Office action from corresponding Chinese Application No. 202310718022.0, dated Jul. 23, 2023. English translation attached.
(Continued)

*Primary Examiner* — Jeremiah R Smith

(57) ABSTRACT

Provided are a positive electrode plate, a lithium ion battery, and an energy storage device. The positive electrode plate includes a positive current collector and a positive active substance layer disposed on at least part of a surface of the positive current collector. The positive active substance layer contains a positive active substance doped with a metal element M. A doping amount of the metal element M in the positive active substance of the positive active substance layer gradually decreases in a thickness direction of the positive electrode plate. A ratio of a doping amount of the metal element M in the positive active substance of the positive active substance layer closest to the positive current collector to a doping amount of the metal element M in the positive active substance of the positive active substance layer farthest from the positive current collector is less than or equal to 8.

12 Claims, 1 Drawing Sheet

(51) Int. Cl.
  *H01M 4/58* (2010.01)
  *H01M 10/0525* (2010.01)
  *H01M 4/02* (2006.01)
(52) U.S. Cl.
  CPC .. *H01M 10/0525* (2013.01); *H01M 2004/021* (2013.01); *H01M 2004/028* (2013.01)

(56) References Cited

U.S. PATENT DOCUMENTS

| 2022/0181622 | A1 | 6/2022 | Dou et al. |
| 2023/0008711 | A1 | 1/2023 | Jeong et al. |

FOREIGN PATENT DOCUMENTS

| CN | 111916665 | A | 11/2020 |
| CN | 112447967 | A | 3/2021 |
| CN | 113078305 | A | 7/2021 |
| CN | 113193167 | A | 7/2021 |
| CN | 113782707 | A | 12/2021 |
| CN | 114497447 | A | 5/2022 |
| CN | 116470005 | A | 7/2023 |
| JP | 2016139583 | A | 8/2016 |
| JP | 2018125218 | A | 8/2018 |

OTHER PUBLICATIONS

The Second Office action from corresponding Chinese Application No. 202310718022.0, dated Aug. 9, 2023. English translation attached.
The Grant Notice from corresponding Chinese Application No. 202310718022.0, dated Aug. 18, 2023. English translation attached.
International Search Report dated Apr. 7, 2024 in International Application No. PCT/CN2024/076150. English translation attached.
Written Opinion of the International Search Authority dated Apr. 7, 2024 in International Application No. PCT/CN2024/076150. English translation attached.

* cited by examiner

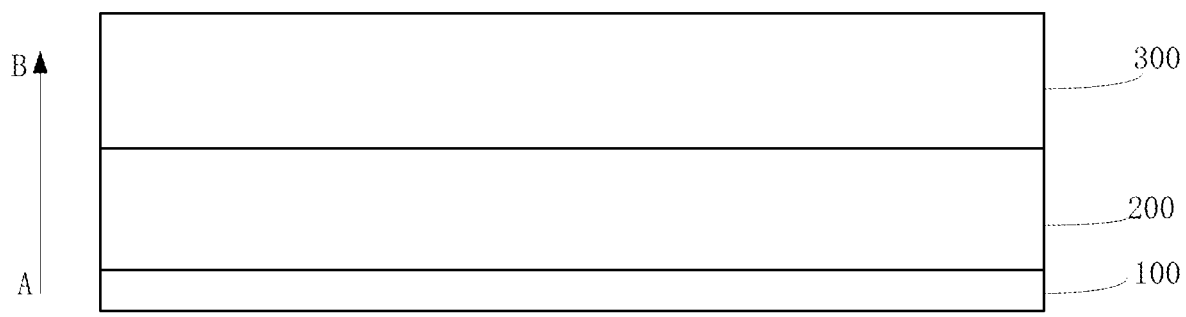

US 12,107,257 B1

POSITIVE ELECTRODE PLATE, LITHIUM ION BATTERY, AND ENERGY STORAGE DEVICE

CROSS-REFERENCE TO RELATED APPLICATIONS

This application claims the priority of the Chinese Patent Application No. 202310718022.0, filed on Jun. 16, 2023, which is incorporated herein by reference in its entirety.

FIELD

The present disclosure belongs to the technical field of lithium ion batteries, and particularly, relates to a positive electrode plate, a lithium ion battery, and an energy storage device.

BACKGROUND

Currently, fossil energy consumption is still a main mode of global energy consumption, accounting for as high as 85% of the of global energy consumption, while renewable energy consumption accounts for only 10% of the global energy consumption. However, if Western countries want to achieve carbon neutrality before 2050, the renewable energy consumption must account for 30% or more. Wind energy and light energy, as important means to achieve carbon neutrality in the future, have shortcomings such as instability and likelihood of impacting power grid, such that their commercial applications are tardy. Therefore, emergence of energy storage will solve these disadvantages on power generation side. The energy storage is an inevitable choice to ensure that power system maintains safe and stable operation after a high proportion of new energy is accessed. Lithium ion batteries are widely applied in the field of the energy storage such as mobile devices, power tools, and electric vehicles due to their high operating voltage and specific energy density. Definitely, with the increasingly higher requirements of users, service life and energy efficiency of the lithium ion battery have become key points to meet the users' requirements.

Existing lithium ion batteries have low discharge energy efficiency during use, resulting in incomplete discharge and insufficient utilization during application. In this regard, it is urgent to further improve the existing lithium ion batteries by enhancing the discharge energy efficiency thereof.

SUMMARY

In a first aspect, the present disclosure provides a positive electrode plate. The positive electrode plate includes a positive current collector and a positive active substance layer. The positive active substance layer includes a first positive active substance layer and a second positive active substance layer. The first positive active substance layer is disposed on at least part of a surface of the positive current collector. The second positive active substance layer is disposed on at least part of a surface of the first positive active substance layer away from the positive current collector. The positive active substance layer contains a positive active substance doped with a metal element Ti. The metal element Ti is configured to enhance deintercalation ability of the positive electrode active substance for lithium ions. A ratio of a doping amount of the metal element Ti in the positive active substance of the first positive active substance layer to the doping amount of the metal element Ti in the positive active substance of the second positive active substance layer ranges from 3 to 5. The doping amount of the metal element Ti in the positive active substance of the first positive active substance layer ranges from 2500 ppm to 6500 ppm. The doping amount of the metal element Ti in the positive active substance of the second positive active substance layer ranges from 750 ppm to 1500 ppm. The positive active substance in the first positive active substance layer and the positive active substance in the second positive active substance layer are lithium iron phosphate.

In a second aspect, the present disclosure provides a lithium ion battery. The lithium ion battery includes a positive electrode plate according to the first aspect.

In a third aspect, the present disclosure provides an energy storage device. The energy storage device includes the lithium ion battery according to the second aspect.

BRIEF DESCRIPTION OF THE DRAWINGS

The above and/or additional aspects and advantages of the present disclosure will become more apparent and more understandable from the following description of embodiments taken in conjunction with the accompanying drawings, in which:

FIGURE is a schematic structural view of a positive electrode plate according to an embodiment of the present disclosure.

REFERENCE NUMERALS

100, positive current collector;
200, first positive active substance layer;
300, second positive active substance layer.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and they are intended to explain, rather than limiting, the present disclosure.

In one aspect, the present disclosure provides a positive electrode plate. According to an embodiment of the present disclosure, referring to FIGURE, the positive electrode plate includes a positive current collector and a positive active substance layer. The positive active substance layer is disposed on at least part of a surface of the positive current collector. The positive active substance layer contains a positive active substance doped with a metal element M. The metal element M is configured to enhance deintercalation ability of the positive active substance for lithium ions. A doping amount of the metal element M in the positive active substance of the positive active substance layer gradually decreases in a thickness direction of the positive electrode plate. The thickness direction of the positive electrode plate is a direction from the positive current collector to the positive active substance layer. In the thickness direction of the positive electrode plate, a ratio of a doping amount of the metal element M in the positive active substance of the positive active substance layer closest to the positive current collector to a doping amount of the metal element M in the positive active substance of the positive active substance layer farthest from the positive current collector is less than or equal to 8. By doping the metal element M in the positive active substance, the positive active substance in the positive active substance layer is endowed with enhanced deintercalation ability for lithium ions overall. The deintercalation ability of the positive active substance in the positive active substance layer (i.e., a lower layer) closest to the positive current collector for lithium ions is improved to the maximum extent. Along a thickness direction away from the positive current collector, the deintercalation ability of the positive active substance in the positive active substance layer for lithium ions is enhanced by the doped metal element M in a decreasing order of magnitude. In this way, the active substances in the upper and lower layers of the positive electrode plate have significantly reduced difference in terms of the deintercalation ability for lithium ions. Therefore, utilization of the active substance in the active substance layer (i.e., the lower layer) closer to the positive current collector can be increased, and a risk of failure of the active substance in the active substance layer (i.e., the upper layer) farther from the positive current collector can be reduced. The discharge energy is improved, and the cycle performance and the energy efficiency of the lithium ion battery can be enhanced by about 5% to 20%, thereby improving the cycle performance and the energy efficiency of the lithium ion battery overall.

The mechanism by which the positive electrode plate according to the present disclosure can achieve the above beneficial effects is described in detail below:

The Applicant has found that, especially in a positive electrode plate coated with a thick active substance layer, lithium ions in the active substance layer farther from the positive current collector are easily deintercalated in a diffusion and transmission process of lithium ions due to the thick active substance layer. That is, the lithium ions of the active substance in the upper layer of the electrode plate are likely deintercalated. In contrast, the lithium ions in the active substance layer closer to the positive current collector are not easily deintercalated. That is, the lithium ions of the active substance in the lower layer of the electrode plate are not likely deintercalated, and thus polarization is likely to occur during the charge and discharge process. During a long-term cycle, the active substance in the active substance layer far away from the positive current collector releases more lithium ions, resulting in that the active substance in the active substance layer far away from the positive current collector is prone to failure. In contrast, the capacity of the active substance in the active substance layer close to the positive current collector cannot be utilized, leading to reduced energy efficiency and reduced cycle life of the lithium ion battery.

In order to solve this problem, according to the present disclosure, the deintercalation ability of the positive active substance for lithium ions is enhanced by doping the metal element M in the positive active substance of the positive active substance layer. The doping amount of the metal element M in the positive active substance of the positive active substance layer gradually decreases in a thickness direction away from the positive current collector. It should be noted that, within a reasonable doping amount range, the deintercalation ability of the positive active substance for lithium ions can be enhanced to a greater extent with an increase in the doping amount of the metal element M in the positive active substance. As a result, the deintercalation ability of the positive active substance in the positive active substance layer for lithium ions is enhanced overall by doping the metal element M in the positive active substance, allowing the lithium ions to have a reduced diffusion resistance in the positive electrode plate. In addition, the deintercalation ability of the positive active substance in the positive active substance layer (i.e., a lower layer) closest to the positive current collector for lithium ions is improved to the maximum extent. Along a thickness direction away from the positive current collector, the deintercalation ability of the positive active substance in the positive active substance layer for lithium ions is enhanced by the doped metal element M in a decreasing order of magnitude. In this way, the active substances in the upper and lower layers of the positive electrode plate have significantly reduced difference in terms of the deintercalation ability for lithium ions. Therefore, utilization of the active substance in the active substance layer (i.e., the lower layer) closer to the positive current collector can be increased, and a risk of failure of the active substance in the active substance layer (i.e., the upper layer) farther from the positive current collector can be reduced. The discharge energy is improved, and the cycle performance and the energy efficiency of the lithium ion battery can be enhanced by about 5% to 20%, thereby improving the cycle performance and the energy efficiency of the lithium ion battery overall.

The Applicant found that, after the positive active substance (such as lithium iron phosphate) is doped with the metal element M, Li—O bond energy in the positive active substance (such as lithium iron phosphate) is weakened, vacancies appear within the structure, the diffusion channel becomes wider, and thus the diffusion resistance of the lithium ions is reduced, thereby allowing the lithium ions to be easily deintercalated. As an example, when lithium iron phosphate is doped with the metal element M, a part of iron elements in a lithium iron phosphate lattice is replaced with the metal element M. As a result, the Li—O bond energy in the lithium iron phosphate lattice is weakened, vacancies appear within the structure, the diffusion channel becomes wider, and thus the diffusion resistance of the lithium ions is reduced, thereby allowing the lithium ions to be easily deintercalated.

The Applicant found that by limiting the ratio of the doping amount of the metal element M in the positive active substance of the positive active substance layer (i.e., the lower layer) closest to the positive current collector to the doping amount of the metal element M in the positive active substance of the positive active substance layer (i.e., the upper layer) farthest from the positive current collector to be less than or equal to 8, the active substances in the upper and the lower layers of the positive electrode plate have significantly reduced difference in terms of the deintercalation ability for lithium ions. If the ratio is greater than 8, the deintercalation ability of the positive active substance in the lower layer for lithium ions may be greater than the deintercalation ability of the positive active substance in the upper layer for lithium ions due to the excessively high doping amount of the metal element M in the positive active substance of the lower layer, thereby leading to a higher risk of the failure of the positive active substance in the lower layer, which is not favorable to the enhancement of the cycle performance and energy efficiency thereof.

According to some specific embodiments of the present disclosure, referring to FIG. 1, the positive active substance layer includes a first positive active substance layer 200 and a second positive active substance layer 300. The first positive active substance layer 200 is disposed on at least part of the surface of the positive current collector 100. The second positive active substance layer 300 is disposed on at least part of a surface of the first positive active substance layer 200 away from the positive current collector 100. A ratio of a doping amount of the metal element M of the positive active substance in the first positive active substance layer 200 to a doping amount of the metal element M of the positive active substance in the second positive active substance layer 300 is less than or equal to 8. In this way, the active substances in the first positive active substance layer and the second positive active substance layer have significantly reduced difference in terms of the deintercalation ability for lithium ions. Therefore, utilization of the active substance in the first positive active substance layer can be increased, and a risk of failure of the active substance in the second positive active substance layer can be reduced. The cycle performance and the energy efficiency can be enhanced by about 5% to 20%, thereby improving the cycle performance and the energy efficiency of the lithium ion battery overall. It should be noted that number of layers of each sub-positive active substance layer is not particularly limited, and there may be two layers, or three layers, four layers, five layers, and the like. Preferably, the respective sub-positive active substance layers contain the same content of the positive active substance.

As some specific examples, in FIG. 1, a direction from the positive current collector to the positive active substance layer is a direction from A to B, which is the thickness direction of the positive electrode plate. In the thickness direction of the positive electrode plate, the positive active substance layer closest to the positive current collector 100 is the first positive active substance layer 200, and the positive active substance layer farthest from the positive current collector 100 is the second positive active substance layer 300.

Further, by limiting the ratio of the doping amount of the metal element M in the positive active substance of the first positive active substance layer to the doping amount of the metal element M in the positive active substance of the second positive active substance layer to be less than or equal to 8, the active substances in the first positive active substance layer and the second positive active substance layer have significantly reduced difference in terms of the deintercalation ability for lithium ions. If the ratio is greater than 8, the deintercalation ability of the positive active substance in the first positive active substance layer for lithium ions may be greater than the deintercalation ability of the positive active substance in the second positive active substance layer for lithium ions due to the excessively high doping amount of the metal element M in the positive active substance of the first positive active substance layer, thereby leading to a higher risk of the failure of the positive active substance in the first positive active substance layer, which is not favorable to the enhancement of the cycle performance and energy efficiency thereof. Preferably, the ratio of the doping amount of the metal element M in the positive active substance of the first positive active substance layer to the doping amount of the metal element M in the positive active substance of the second positive active substance layer ranges from 3 to 5.

Further, the doping amount of the metal element M in the positive active substance of the first positive active substance layer ranges from 2000 ppm to 7000 ppm; and/or the doping amount of the metal element M in the positive active substance of the second positive active substance layer ranges from 500 ppm to 2000 ppm. By limiting the doping amount of the metal element M in the positive active substance of the first positive active substance layer and the doping amount of the metal element M in the positive active substance of the second positive active substance layer within the above ranges, the active substances in the first positive active substance layer and the second positive active substance layer can have further reduced difference in terms of the deintercalation ability for lithium ions, the utilization of the active substance in the first positive active substance layer is improved, and the risk of failure of the active substance in the second positive active substance layer is reduced. The cycle performance and the energy efficiency of the lithium ion battery are improved by about 5% to 20%, thereby improving the cycle performance and the energy efficiency of the lithium ion battery overall.

It should be noted that the doping amount of the metal element M refers to a content of the metal element M based on a total mass of the positive active substance doped with the metal element M.

In the embodiments of the present disclosure, the specific types of the above-mentioned positive active substance are not particularly limited, and those skilled in the art can flexibly select according to actual needs. As some specific examples, the positive active substance includes at least one of lithium iron phosphate, lithium nickelate, lithium manganate, lithium cobaltate, lithium manganese phosphate, lithium vanadium phosphate, lithium-nickel-cobalt-aluminum oxide, and lithium-nickel-cobalt-manganese oxide. Lithium iron phosphate is preferred. In addition, the type of positive active substance in the first positive active substance layer may be same as or differ from the type of positive active substance in the second positive active substance layer. Preferably, the positive active substance in the first positive active substance layer and the positive active substance in the second positive active substance layer are both lithium iron phosphate.

In the embodiments of the present disclosure, the specific type of the above-mentioned doped metal element M is not particularly limited and may be selected according to the specific type of the positive active substance. For example, the metal element M doped in lithium iron phosphate should have a similar atomic radius to that of the iron element, such that a part of the iron element in the lithium iron phosphate crystal lattice can be replaced with the metal element M. When the positive active substance is lithium iron phosphate, the metal element M may be selected from at least one of Ti, V, Mg, and Al, and preferably, Ti element. It should be noted that the type of the metal element M doped in the positive active substance of the first positive active substance layer may be same as or differ from the type of the metal element M doped in the positive active substance of the second positive active substance layer. Preferably, the positive active substance in the first positive active substance layer and the positive active substance in the second positive active substance layer are both doped with the metal element Ti.

As before, in a thickly coated positive electrode plate, for example, the positive active substance layer having a surface density ranging from 300 mg/1540.12 $mm^2$ to 500 mg/1540.12 $mm^2$, lithium ions in the active substance layer farther from the positive current collector are easily deintercalated in a diffusion and transmission process of lithium ions due to the thick active substance layer. That is, the lithium ions of the active substance in the upper layer of the electrode plate are likely deintercalated. In contrast, the lithium ions in the active substance layer closer to the positive current collector are not easily deintercalated. That is, the lithium ions of the active substance in the lower layer of the electrode plate are not likely deintercalated, and thus polarization is likely to occur during the charge and discharge process. According to the present disclosure, multiple active substance layers are provided, the active substance layer closer to the positive current collector have a relatively higher doping amount of the metal element, and the active substance layer farther from the positive electrode collector have a relatively lower doping amount of the metal element. In this way, the active substances in the upper layer and the lower layer of the positive electrode plate have reduced difference in terms of the deintercalation ability for lithium ions.

Further, the first positive active substance layer has a surface density ranging from 150 mg/1540.12 mm$^2$ to 250 mg/1540.12 mm$^2$; and/or the second positive active substance layer has a surface density ranging from 150 mg/1540.12 mm$^2$ to 250 mg/1540.12 mm$^2$. As a result, the active substances in the first positive active substance layer and the second positive active substance layer can have further reduced difference in the deintercalation ability for lithium ions, the utilization of the active substance in the first positive active substance layer is improved, and the risk of failure of the active substance in the second positive active substance layer is reduced. The cycle performance and the energy efficiency of the lithium ion battery are improved by about 5% to 20%, thereby improving the cycle performance and the energy efficiency of the lithium ion battery overall.

In the embodiments of the present disclosure, in addition to the positive active substance, the positive active substance layer further includes a conductive agent, a binder, and a dispersant. A mass ratio of the positive active substance, the conductive agent, the binder, and the dispersant is (94.5 to 98.5):(0.5 to 2.0):(1 to 3.0):(0 to 1). The conductive agent includes, but is not limited to, at least one of acetylene black, Super P, carbon nanotubes, graphene, and conductive carbon fiber. The binder includes, but is not limited to, at least one of PVDF, PTFE, and NBR.

In the embodiments of the present disclosure, the doping amount of the metal element M in the positive active substance of the positive active substance layer can be measured with ICP test method.

In the embodiments of the present disclosure, a preparation method of the above-mentioned positive electrode plate is as follows.

(1) According to a conventional method for preparing a positive electrode plate known in the related art, the positive active substance doped with different amount of the metal element M, the conductive agent, the binder, and the dispersant are weighed according to a preset mass ratio, the solvents are added to stir and mix in a certain way. Positive electrode slurries are formed respectively. A solid content of the positive electrode slurry is not particularly limited, for example, the solid content may range from 40% to 80%. The specific type of the solvent is not particularly limited, and for example, at least one of N-methyl pyrrolidone (NMP), dimethylformamide (DMF), and dimethyl sulfoxide (DMSO) may be selected.

For example, a positive active substance with a doping amount of the metal element ranging from 2000 ppm to 3000 ppm, a conductive agent, a binder, a dispersant, and a solvent are mixed to form a first positive electrode slurry, and a positive active substance with a doping amount of the metal element ranging from 500 ppm to 1500 ppm, the conductive agent, the binder, the dispersant, and the solvent are mixed to form a second positive electrode slurry.

It should be noted that the preparation method of positive active substances with different doping amounts of the metal element belongs to conventional technical means in the art, which is not elaborated herein.

(2) The respective positive electrode slurries prepared in step (1) are respectively coated on a positive current collector according to a descending order of the doping amount of the metal element, and the positive electrode plate is formed after drying. The positive electrode plates are cut into specific shapes for later use according to different battery case.

For example, a first positive electrode slurry with a doping amount of the metal element ranging from 2000 ppm to 3000 ppm is first coated on the positive current collector and then dried, to form a first positive active substance layer. Then, a second positive electrode slurry with a doping amount of the metal element ranging from 500 ppm to 1500 ppm is coated on a surface of the first positive active substance layer away from the positive current collector and then dried, to form a second positive active substance layer.

Preferably, the first positive active substance layer has a coating surface density ranging from 150 mg/1540.12 mm$^2$ to 250 mg/1540.12 mm$^2$, and/or the second positive active substance layer has a coating surface density ranging from 150 mg/1540.12 mm$^2$ to 250 mg/1540.12 mm$^2$.

In a second aspect of the present disclosure, the present disclosure provides a lithium ion battery. According to the embodiments of the present disclosure, the lithium ion battery includes the positive electrode plate as described in the above embodiments. Accordingly, the cycle performance and the energy efficiency of the lithium ion battery are improved.

In an embodiment, the lithium ion battery includes the positive electrode plate as described in the above embodiments, a negative electrode plate, and a separator. The separator is disposed between the positive electrode plate and the negative electrode plate. The separator includes at least one of PP separator, PE separator, single-sided ceramic separator, double-sided ceramic separator, non-woven separator, and glass fiber separator.

The negative electrode plate includes a negative current collector and a negative active substance layer formed on the negative current collector. The negative active substance layer includes a negative active substance (such as graphite), a negative dispersant, a conductive agent, a negative binder, and a plasticizer. Further, a mass ratio of the negative active substance, the negative dispersant, the conductive agent, the negative binder, and the plasticizer is (97 to 98.5):(1.2 to 1.6):(0.4 to 2.0):(1.3 to 2.3):(1 to 2).

The preparation method of the negative electrode plate includes: mixing the negative active substance, negative electrode dispersant, conductive agent, negative electrode binder, and plasticizer evenly according to a preset ratio; adding solvent and stirring evenly to form a negative electrode slurry; and then coating the slurry on the current collector and drying; and cutting the current collector into specific shapes of negative electrode plates according to the battery casing for later use. Further, a solid content of the negative electrode slurry ranges from 40% to 60%.

Preparation of a cell: adding the separator between the positive electrode plate and the negative electrode plate for winding; welding tabs of the positive and negative electrodes; encapsulating the bare cell in an aluminum plastic film; baking the cell in vacuum for 10 hours to 20 hours; and performing liquid injection, standing, high temperature and high pressure formation, de-gassing encapsulation, and volume division, to obtain a lithium ion battery with a double-layer coated positive electrode.

In a third aspect of the present disclosure, the present disclosure provides an energy storage device. According to an embodiment of the present disclosure, the energy storage device includes the above lithium ion battery. Therefore, the energy storage device has all the advantages of the lithium ion battery, which will not be repeated herein.

In an embodiment, the energy storage device may include at least one of an electric energy storage apparatus for a power generation side of an electric power system, an electric energy storage apparatus for a distribution side of the electric power system (such as an electrochemical energy storage apparatus), and an electric energy storage apparatus for a consumer side of the electric power system.

The embodiments of the present disclosure are described in detail below. It should be noted that the embodiments described below are exemplary and are only used to explain the present disclosure and cannot be construed as imitations of the present disclosure. In addition, if not explicitly stated, all reagents used in the following examples are commercially available or can be synthesized according to methods described herein or known methods. The unspecified reaction conditions are also readily available to those skilled in the art.

Example 1

The present example provided a lithium ion battery, and a preparation method thereof included the following steps.
(1) Preparation of a positive electrode slurry:
  a. Preparation of a first positive electrode slurry: lithium iron phosphate, conductive agent C, binder PVDF, and dispersant PVP were weighed according to a mass ratio, in which the doping amount of Ti element in lithium iron phosphate was 2500 ppm, the mass ratio of lithium iron phosphate, conductive agent, binder, and dispersant was 96.5:1.25:2:0.5; NMP solvent was added, stirred, and mixed to form a first positive electrode slurry with a solid content of 60%.
  b. Preparation of a second positive electrode slurry: lithium iron phosphate, conductive agent, binder, and dispersant were weighed according to a mass ratio, in which the doping amount of Ti element in lithium iron phosphate was 750 ppm, the mass ratio of lithium iron phosphate, conductive agent, binder, and dispersant was 96.5:1.25:2:0.5; the solvent was added, stirred, and mixed to form a second positive electrode slurry with a solid content of 60%.
(2) Preparation of a negative electrode slurry: graphite, negative electrode dispersant sodium carboxymethyl cellulose, conductive agent SP, negative electrode binder SBR, and plasticizer propylene glycol were weighed according to a mass ratio, in which the mass ratio of graphite, negative electrode dispersant, conductive agent, negative electrode binder, and plasticizer was 97.75:1.4:1.2:1.8:1.5; and water was added as solvent, and stirred evenly to form a negative electrode slurry with a solid content of 50%.
(3) Preparation of a positive electrode plate and a negative electrode plate:
Preparation of a positive electrode plate: the first positive electrode slurry formed in step a was coated, as a first layer, on the positive current collector at a coating surface density of about 200 mg/1540.12 $mm^2$, and dried; the second positive electrode slurry formed in step b was coated, as a second layer, on the positive current collector at a coating surface density of about 200 mg/1540.12 $mm^2$, and dried; and the obtained positive electrode plate was rolled and cut to obtain the final positive electrode plate.
Preparation of a negative electrode plate: the negative electrode slurry obtained in step (2) was evenly coated on the negative current collector and dried. The obtained electrode plate was rolled and cut to obtain the negative electrode plate.

(4) Preparation of a cell: a separator was added between the positive electrode plate and the negative electrode plate for winding; welding tabs of the positive and negative electrodes; encapsulating the bare cell in an aluminum plastic film; baking the cell in vacuum for 15 hours; and then performing liquid injection, standing, high temperature and high pressure formation, de-gassing encapsulation, and volume division, to obtain a lithium ion battery with a double-layer coated positive electrode. The electrolyte of the lithium ion battery included lithium hexafluorophosphate and dimethyl carbonate, and a concentration of the lithium hexafluorophosphate was 1 mol/L.

Example 2

Example 2 provided a lithium ion battery. Example 2 differed from Example 1 in that: in step a, the doping amount of Ti element in lithium iron phosphate was 3500 ppm; and in step b, the doping amount of Ti element in lithium iron phosphate was 1500 ppm.
The others were the same as Example 1.

Example 3

Example 3 provided a lithium ion battery. Example 3 differed from Example 1 in that: in step a, the doping amount of Ti element in lithium iron phosphate was 4500 ppm; and in step b, the doping amount of Ti element in lithium iron phosphate was 1500 ppm.
The others were the same as Example 1.

Example 4

Example 4 provided a lithium ion battery. Example 4 differed from Example 1 in that: in step a, the doping amount of Ti element in lithium iron phosphate was 5500 ppm; and in step b, the doping amount of Ti element in lithium iron phosphate was 1500 ppm.
The others were the same as Example 1.

Example 5

Example 5 provided a lithium ion battery. Example 5 differed from Example 1 in that: in step a, the doping amount of Ti element in lithium iron phosphate was 6500 ppm; and in step b, the doping amount of Ti element in lithium iron phosphate was 1500 ppm.
The others were the same as Example 1.

Comparative Example 1

Comparative example 1 provided a lithium ion battery. Comparative example 1 differed from Example 1 in that: in step a, the doping amount of Ti element in lithium iron phosphate was 750 ppm; and in step b, the doping amount of Ti element in lithium iron phosphate was 750 ppm.
The others were the same as Example 1.

Comparative Example 2

Comparative example 2 provided a lithium ion battery. Comparative example 2 differed from Example 1 in that: in step a, the doping amount of Ti element in lithium iron phosphate was 1500 ppm; and in step b, the doping amount of Ti element in lithium iron phosphate was 1500 ppm.
The others were the same as Example 1.

Cycle performance test: at 25° C., the batteries prepared in Example 1 to Example 5 and Comparative Example 1 to Comparative Example 2 were charged to 3.65V at 1P rate and discharged to 2.5V at 1P rate to perform a full-charge-discharge cycle test, until the capacity of the lithium ion battery was less than 80% of the initial capacity. The number of cycles and energy efficiency were recorded. The test results were shown in Table 1.

TABLE 1

| | Doping amount of Ti element in the first layer of lithium iron phosphate | Doping amount of Ti element in the second layer of lithium iron phosphate | Energy efficiency of battery |
|---|---|---|---|
| Example 1 | 2500 ppm | 750 ppm | 90.5% |
| Example 2 | 3500 ppm | 1500 ppm | 93% |
| Example 3 | 4500 ppm | 1500 ppm | 94.5% |
| Example 4 | 5500 ppm | 1500 ppm | 95.5% |
| Example 5 | 6500 ppm | 1500 ppm | 96.5% |
| Comparative example 1 | 750 ppm | 750 ppm | 86% |
| Comparative example 2 | 1500 ppm | 1500 ppm | 87.5% |

As can be seen from Table 1, the lithium ion batteries of Example 1 to Example 5 have significantly higher the energy efficiency than those of Comparative Example 1 and Comparative Example 2.

In the specification, the description of the reference terms such as "one embodiment", "some embodiments", "example", "specific example", or "some example" means that the specific features, structures, materials or characteristics described with reference to the embodiment or example are included in at least an embodiment or example of the present disclosure. In this specification, exemplary descriptions of the foregoing terms do not necessarily refer to the same embodiment or example. Moreover, the specific features, structures, materials, or characteristics described may be combined in any one or more embodiments or examples in a suitable manner. Furthermore, those skilled in the art may combine different embodiments or examples and features of different embodiments or examples described in this specification, unless they are contradictory to each other.

Although embodiments of the present disclosure are illustrated and described above, it can be understood that the above embodiments are illustrative and should not be construed as limitations of the present disclosure. Those skilled in the art can make changes, modifications, substitutions, and variations to the above embodiments within the scope of the present disclosure.

What is claimed is:

1. A positive electrode plate, comprising:
a positive current collector; and
a positive active substance layer comprising a first positive active substance layer and a second positive active substance layer, the first positive active substance layer being disposed on at least part of a surface of the positive current collector, the second positive active substance layer being disposed on at least part of a surface of the first positive active substance layer away from the positive current collector, the positive active substance layer containing a positive active substance doped with a metal element Ti, the metal element Ti being configured to enhance deintercalation ability of the positive electrode active substance for lithium ions, wherein:
a ratio of a doping amount of the metal element Ti in the positive active substance of the first positive active substance layer to the doping amount of the metal element Ti in the positive active substance of the second positive active substance layer ranges from 3 to 5;
the doping amount of the metal element Ti in the positive active substance of the first positive active substance layer ranges from 2500 ppm to 6500 ppm;
the doping amount of the metal element Ti in the positive active substance of the second positive active substance layer ranges from 750 ppm to 1500 ppm; and
the positive active substance in the first positive active substance layer and the positive active substance in the second positive active substance layer are lithium iron phosphate.

2. The positive electrode plate according to claim 1, wherein the positive active substance layer has a surface density ranging from 300 mg/1540.12 $mm^2$ to 500 mg/1540.12 $mm^2$.

3. The positive electrode plate according to claim 1, wherein:
the first positive active substance layer has a surface density ranging from 150 mg/1540.12 $mm^2$ to 250 mg/1540.12 $mm^2$; and/or
the second positive active substance layer has a surface density ranging from 150 mg/1540.12 $mm^2$ to 250 mg/1540.12 $mm^2$.

4. The positive electrode plate according to claim 1, wherein:
the positive active substance layer further contains a conductive agent, a binder, and a dispersant; and
a mass ratio of the positive active substance, the conductive agent, the binder, and the dispersant is (94.5 to 98.5):(0.5 to 2.0):(1 to 3.0):(0 to 1).

5. A lithium ion battery, comprising a positive electrode plate, the positive electrode plate comprising:
a positive current collector; and
a positive active substance layer comprising a first positive active substance layer and a second positive active substance layer, the first positive active substance layer being disposed on at least part of a surface of the positive current collector, the second positive active substance layer being disposed on at least part of a surface of the first positive active substance layer away from the positive current collector, the positive active substance layer containing a positive active substance doped with a metal element Ti, the metal element Ti being configured to enhance deintercalation ability of the positive electrode active substance for lithium ions, wherein:
a ratio of a doping amount of the metal element Ti in the positive active substance of the first positive active substance layer to the doping amount of the metal element Ti in the positive active substance of the second positive active substance layer ranges from 3 to 5;
the doping amount of the metal element Ti in the positive active substance of the first positive active substance layer ranges from 2500 ppm to 6500 ppm;
the doping amount of the metal element Ti in the positive active substance of the second positive active substance layer ranges from 750 ppm to 1500 ppm; and
the positive active substance in the first positive active substance layer and the positive active substance in the second positive active substance layer are lithium iron phosphate.

6. The lithium ion battery according to claim 5, wherein the positive active substance layer has a surface density ranging from 300 mg/1540.12 mm² to 500 mg/1540.12 mm².

7. The lithium ion battery according to claim 5, wherein:
the first positive active substance layer has a surface density ranging from 150 mg/1540.12 mm² to 250 mg/1540.12 mm²; and/or
the second positive active substance layer has a surface density ranging from 150 mg/1540.12 mm² to 250 mg/1540.12 mm².

8. The lithium ion battery according to claim 5, wherein:
the positive active substance layer further contains a conductive agent, a binder, and a dispersant; and
a mass ratio of the positive active substance, the conductive agent, the binder, and the dispersant is (94.5 to 98.5):(0.5 to 2.0):(1 to 3.0):(0 to 1).

9. An energy storage device, comprising a lithium ion battery, the lithium ion battery comprising a positive electrode plate, the positive electrode plate comprising:
a positive current collector; and
a positive active substance layer comprising a first positive active substance layer and a second positive active substance layer, the first positive active substance layer being disposed on at least part of a surface of the positive current collector, the second positive active substance layer being disposed on at least part of a surface of the first positive active substance layer away from the positive current collector, the positive active substance layer containing a positive active substance doped with a metal element Ti, the metal element Ti being configured to enhance deintercalation ability of the positive electrode active substance for lithium ions, wherein:
a ratio of a doping amount of the metal element Ti in the positive active substance of the first positive active substance layer to the doping amount of the metal element Ti in the positive active substance of the second positive active substance layer ranges from 3 to 5;
the doping amount of the metal element Ti in the positive active substance of the first positive active substance layer ranges from 2500 ppm to 6500 ppm;
the doping amount of the metal element Ti in the positive active substance of the second positive active substance layer ranges from 750 ppm to 1500 ppm; and
the positive active substance in the first positive active substance layer and the positive active substance in the second positive active substance layer are lithium iron phosphate.

10. The energy storage device according to claim 9, wherein the positive active substance layer has a surface density ranging from 300 mg/1540.12 mm² to 500 mg/1540.12 mm².

11. The energy storage device according to claim 9, wherein:
the first positive active substance layer has a surface density ranging from 150 mg/1540.12 mm² to 250 mg/1540.12 mm²; and/or
the second positive active substance layer has a surface density ranging from 150 mg/1540.12 mm² to 250 mg/1540.12 mm².

12. The energy storage device according to claim 9, wherein:
the positive active substance layer further contains a conductive agent, a binder, and a dispersant; and
a mass ratio of the positive active substance, the conductive agent, the binder, and the dispersant is (94.5 to 98.5):(0.5 to 2.0):(1 to 3.0):(0 to 1).

\* \* \* \* \*